United States Patent [19]
Hughes

[11] 3,870,927
[45] Mar. 11, 1975

[54] CAPACITOR VOLTAGE TRANSFORMER SYSTEM
[75] Inventor: Michael Alan Hughes, Gnosall, England
[73] Assignee: The English Electric Company Limited, London, England
[22] Filed: Oct. 4, 1973
[21] Appl. No.: 403,489

Related U.S. Application Data
[63] Continuation-in-part of Ser. No. 260,247, June 6, 1972, abandoned.

[30] Foreign Application Priority Data
June 8, 1971 Great Britain ............. 19420/71

[52] U.S. Cl. ............... 317/12 B, 317/31, 324/126
[51] Int. Cl. ............................. H02h 7/16
[58] Field of Search ........ 324/126; 317/12 B, 12 R, 317/14'R, 14 B, 31, 61, 49, 50, 53; 307/149; 323/61

[56] References Cited
UNITED STATES PATENTS
2,756,414  7/1956  Doremus .............. 324/126 X
2,933,652  4/1960  Cuttino .............. 317/12 B
3,530,502  9/1970  Nishidai ............. 317/12 B Primary Examiner—James D. Trammell
Attorney, Agent, or Firm—Kirschstein, Kirschstein, Ottinger & Frank

[57] ABSTRACT
In a capacitor voltage transformer system consisting of a capacitor chain and an electromagnetic transformer, an impedance network having a transfer function which is the inverse of the transfer function between the input and the output of the CVT under operating conditions is connected across the output of the electro-magnetic transformer to obviate distortions produced in the output due to rapidly changing input conditions.

4 Claims, 4 Drawing Figures

CAPACITOR VOLTAGE TRANSFORMER SYSTEM

This application is a continuation-in-part of U.S. Ser. No. 260,247 filed June 6, 1972, now abandoned.

This invention is concerned with improving the transient response of capacitor voltage transformers.

For measurement of very high voltages, e.g., 100 KV and above, capacitor voltage transformers are used almost universally in preference to electromagnetic voltage transformers, for reasons of cost. A capacitor voltage transformer consists essentially, and in this specification is defined as so consisting, of a chain of capacitors connected across the voltage to be measured, i.e., between the line whose voltage is to be measured and earth, with an electro-magnetic transformer unit connected across the bottom capacitor of the chain. In addition to simple voltage measurement, capacitor voltage transformers may be used for such purposes as the transmission of high frequency signals on the high voltage line, network protection schemes, and the supply of synchronizing devices.

In this arrangement, the electromagnetic transformer unit includes an iron-cored transformer, together with, usually, an extra inductance which tunes the unit to the rated frequency with the capacitance of the chain, and further devices such as spark gaps and means for the suppression of ferroresonance and for high frequency transmission. Under steady state conditions, the output voltage will be in phase with and proportional to the line voltage. Under changing conditions, however, transients are generated in the capacitors and the electro-magnetic transformer and the output voltage cannot follow the change in the line voltage closely. Whilst this is unimportant with regard to metering circuits and certain slow acting protective circuits, it can adversely affect the performance of high speed protective circuits which are expected to operate well before the transients have died away.

An object of the present invention is to provide an improved capacitor voltage transformer system providing an output which closely follows the line voltage in the presence of transients.

In this specification, circuits which need an input which follows the line voltage closely, i.e., those whose performance is adversely affected by transients are termed "fast response" circuits and circuits which do not need to follow the change closely, i.e., those whose performance is not adversely affected by transients are termed "slow response" circuits.

Accordingly, the invention provides a capacitor voltage transformer consisting of a chain of capacitors connected between a line whose voltage is to be measured and earth with an electromagnetic transformer unit connected across the bottom capacitor of the chain, and an impedance network connected to the output of the electromagnetic transformer and having a transfer function which is substantially the inverse of the transfer function between the input and output of the capacitor voltage transformer under operating conditions. The impedance network may conveniently consist of one or more operational amplifiers each with two impedances in a voltage divider connection providing negative feedback. The invention also provides a system consisting of such a capacitor voltage transformer, slow response circuits fed from the electromagnetic transformer unit, and fast response circuits fed from the impedance network.

The invention therefore permits fast response circuits to be added to an existing capacitor voltage transformer system by the addition of circuitry to the output of the electromagnetic transformer unit, without requiring any change in the system before that point.

Two embodiments of the invention will now be described in detail, by way of example, with reference to the accompanying drawings, in which.

Figure 1:
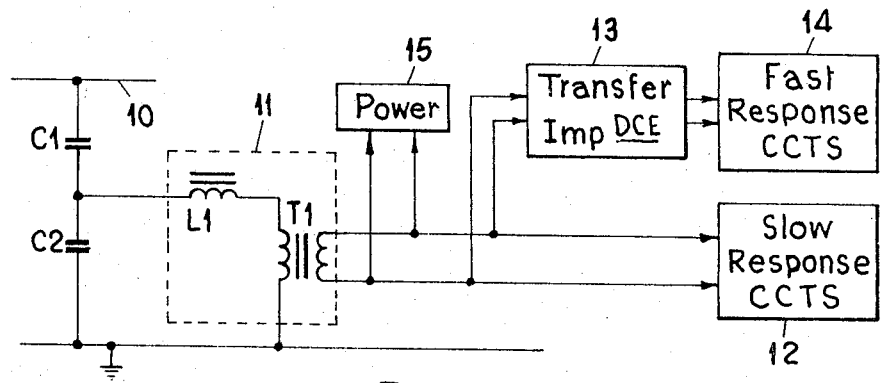
FIG. 1 is a general diagram, mainly in block form.

Referring first to FIG. 1, the voltage on line 10 is to be measured. A capacitor chain consisting of capacitors C1 and C2 is connected between line 10 and earth; C1 may consist of a series of capacitors. An electromagnetic unit 11 is connected across capacitor C2; this unit includes a transformer T1, a further tuning inductor L1 which provides any inductance required in addition to that of the transformer T1, and other circuitry not shown. The unit 11 feeds slow response circuits 12; these circuits are not required to respond in a time taken for transient errors between the voltage on line 10 and the output of unit 11 to dissipate.

The unit 11 also feeds fast response circuits 14 via an impedance network 13; the fast response circuits 14 are required to respond to changes in the voltage on line 10 rapidly, e.g., within a single cycle, so that the input signal to these circuits must follow the voltage on line 10 accurately even when the voltage on line 10 is changing rapidly. The output from unit 11 will fail to follow the voltage on line 10 under such conditions, since it is tuned to the fundamental frequency of the supply on line 10. The impedance network 13 is arranged to have a transfer function which is the inverse of the transfer function between the input and the output of the capacitor voltage transformer, so that the distortion produced by the capacitor voltage transformer is exactly counteracted. Of course, the transfer function is dependent on the load connected to the output of the transformer.

The fast response circuits 14 and the impedance network 13 may require power supplies for their operation; a power unit 15 is therefore also connected to the output of unit 11 for this purpose. The presence of the power unit 15 also affects the transfer function.

Figure 2:
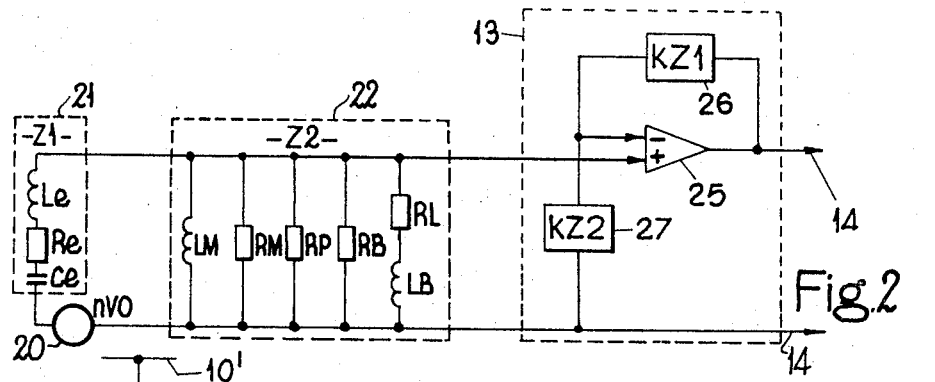
FIGS. 2 and 4 are circuit diagrams of two forms of impedance network together with equivalent circuits of the capacitor voltage transformer.

Referring now to FIG. 2, one form of impedance network will be described. The left-hand part of FIG. 2 is the equivalent circuit of the system as seen from the input to the impedance network 13 derived by use of Thevenin's therorem, which assumes that the capacitor chain is homogeneous. The voltage seen is $nV_O$ at a source 20 where n is the turns ratio of the transformer 1, and $V_O$ is the open-circuit voltage across capacitor C2, i.e., $C1/C1 + C2$ times the voltage on line 10. This voltage is in series with an equivalent impedance 21, of value Z1, comprising a capacitance Ce (formed by C1 and C2 in parallel, as seen through the transformer T1), a resistance Re (mainly in the electro-magnetic unit 11), and an inductance Le (in the unit 11). There is also a shunting impedance 22, of value Z2, formed by the load of the slow response circuits 12, the power unit 15, and the magnetizing branch of transformer T1 together. The equivalent impedance of the magnetising branch of the transformer T1 can be represented by an inductance LM and a resistance RM in parallel, the inductance drawing the appropriate magnetising current and the resistor dissipating the appropriate losses. The equivalent impedance of the power unit can be represented as a resistance RP. The equivalent impedance of the slow response circuits does, of course depend on what these circuits are. Typically however, the slow response circuits could consist of voltmeters, wattmeters, check synchronising relays, frequency meters or a combination thereof. However, a typical impedance thereof is representable as a resistor RB in parallel with a series combination of a resistor RL and an inductor LB. Typically, the components of these equivalent impedances could have the following values: $Ce = 1,500 \mu F$, $Re = 0.5 \Omega$, $Le = 5mH$, $LM = 2H$ $RM = 500 \Omega$, $RP = 1K \Omega$, $RB = 90 \Omega$, $RL = 30 \Omega$, $LB = 160mH$ The network 13 consists essentially of an amplifier 25 of high input impedance with a feedback impedance chain of impedances 26 and 27, whose values are adjusted to be $kZ1$ and $kZ2$ i.e., k times the value of the impedances 21 and 22 respectively, where k is some convenient constant. Thus, the impedance 26 could consist of a capacitance $Ce/k$, a resistor $kRe$ and an inductor $kLe$ in series and the impedance 27 could consist of an inductance $kLM$, a resistor $kRM$, a resistance $kRP$ and a resistance $kRB$ in parallel and a series combination of a resistance $kRL$ and an inductance $kLB$ in parallel with the other components. A suitable value for k could be 1,000 and using the typical values mentioned above the impedances 26 and 27 could be formed as follows:

Impedance 26: a $1.5\mu F$ capacitor, a 500 $\Omega$ resistor and a 10H inductor in series Impedance 27: a series combination of 30 k $\Omega$ resistor and a 160H inductor in a parallel combination with a 2 kH inductor, a 500 k $\Omega$ resistor, a 1M $\Omega$ resistor and a 90k $\Omega$ resistor.

The input voltage to the network 13, say V1, is given by $$V1 = n \cdot Z2 \cdot VO/Z1 + Z2$$

and the output voltage from the network 13, say V2, is given by $$V2 = kZ1 + kZ2/kZ2 \; V1 = Z1 + Z2/Z2 \; V1 = nVO.$$

Thus the impedance network 13 exactly compensates for the distortion due to the capacitor voltage divider, the unit 11, and the loads thereon, apart from a trivial scalar. The accuracy of the final output 14 would depend on the accuracy with which the equivalent circuits were established. Perfect accuracy cannot be achieved and there must always be some error. However, the use of the transfer impedance network 13 means that the error in the final output is significantly smaller than if the network 13 was not present.

Whilst the equivalent impedance of the magnetising branch of the transformer T1 has been stated to be an inductance LM and a resistance RM in parallel, a more accurate equivalent can be produced by using a toroidal magnetic core of the same material as the actual transformer. This would give the appropriate level of magnetising current and losses at a steady state flux density equal to the transformer operating level. In this way, the non-linearity of the magnetising branch is accurately represented.

Figure 3:
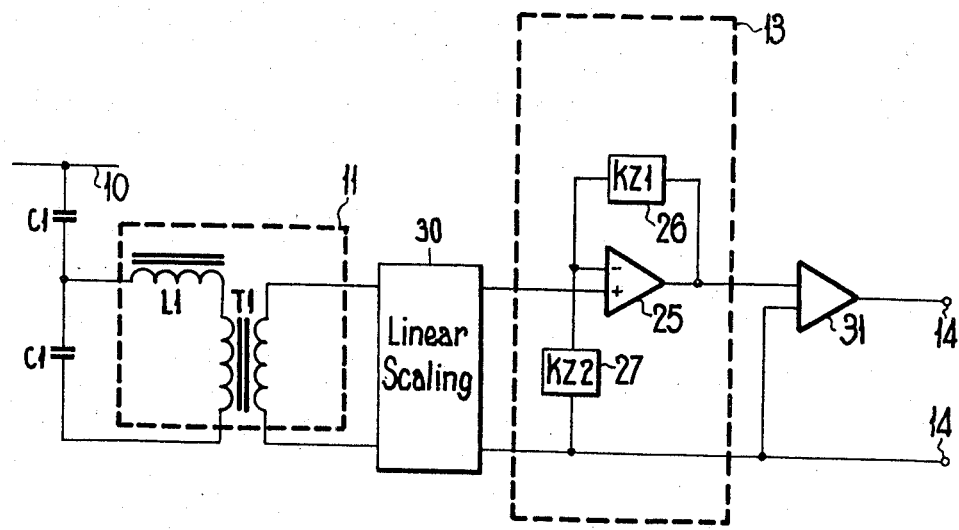
FIG. 3 shows a practical arrangement of FIG. 2.

A linear scaling unit 30 may be provided between the output of the transformer 11 and the impedance network 13 as shown in FIG. 3. This unit 30 is a voltage divider which provides a signal level that is suitable for a small integrated circuit operational amplifier at low power. A buffer amplifier 31 of appropriate rating is then required to supply the burden, e.g., the fast response circuits 14 at the required voltage level.

Figure 4:
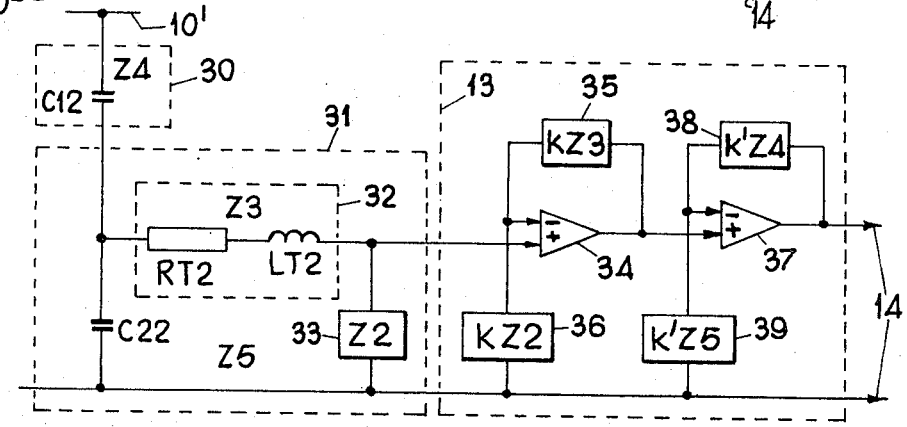

FIG. 4 shows an alternative form of impedance network. On the left-hand side, the equivalent circuit has been derived without employing the Thevenin's theorem simplification. This equivalent circuit is therefore one for any combination of impedances in the chain. The two capacitors appear as C12 and C22, the first forming an impedance 30 of value Z4. The transformer and inductor in the unit 11 appear as an impedance 32, of value Z3, formed by a resistance RT2 and an inductance LT2. The load of the slow response circuits 12, the power unit 15 and the magnetizing branch of transformer T1 are shown as an impedance 33, value Z2. The equivalent capacitor C22 and the impedances 32 and 33 together form an impedance 31, value Z5. The impedance 33 is exactly the same as the impedance 22 in FIG. 2 and the same typical values apply. The resistance RT2 and the inductance LT2 have the same typical values as the inductance Le and the resistance Re of the impedance 21 in FIG. 2. Typical values of the capacitors C12 and C22 are 100 F and 1400 F respectively.

The network 13 consists here of two amplifiers, each with a feedback path. The first stage consists of amplifier 34, with feedback impedances 35 and 36, of values $kZ3$ and $kZ2$ respectively i.e., k times the value of the impedances 32 and 33, and the second stage consists of amplifier 37, with feedback impedances 38 and 39, of values $k'Z4$ and $k'Z5$ respectively i.e., $k'$ times the value of the impedances 30 and 31; k and $k'$ are convenient constants, which may be equal.

Thus, the impedances 35, 36, 38 and 39 could be formed as follows assuming that both k and $k'$ are 1,000:

Impedance 35: — a 500 $\Omega$ resistor and a 10H inductor in series

Impedance 36: — same as impedance 27

Impedance 38: — a 0.1 $\mu$ F capacitor

Impedance 39: — a series combination of a 500 $\Omega$ resistor, a 10H inductor and the impedance 27 in parallel with a 1.4 $\mu$ F capacitor.

This arrangement permits a more accurate adjustment of the transfer characteristics of the network 13. A linear scaling unit may be incorporated in the same way as in FIG. 3.

I claim:

1. A capacitor voltage transformer system comprising:
   a. a capacitor voltage transformer consisting of:
      1. a chain of capacitors across which an input voltage is applied; and
      2. an electromagnetic transformer having an input connected across the capacitor of said chain and an output at which the output of the capacitor voltage transformer appears;
   and
   b. an impedance network having an input connected to the output of said electromagnetic transformer and an output from which an output of the system is derived;
   c. the impedance network having been its input and output a transfer function which is substantially the inverse of the transfer function between the input and the output of the capacitor voltage transformer under operating conditions.

2. A system according to claim 1, in which the impedance network comprises an operational amplifier with two impedances in a voltage divider connection providing negative feedback.

3. A system according to claim 1, in which the impedance network comprises a pair of operational amplifiers connected in cascade, each with two impedances in a voltage divider connection providing negative feedback.

4. A system according to claim 1, including at least one fast response circuit connected to the output of the impedance circuit and at least one slow response circuit connected to the output of the electromagnetic transformer.

* * * * *